Figure 4:

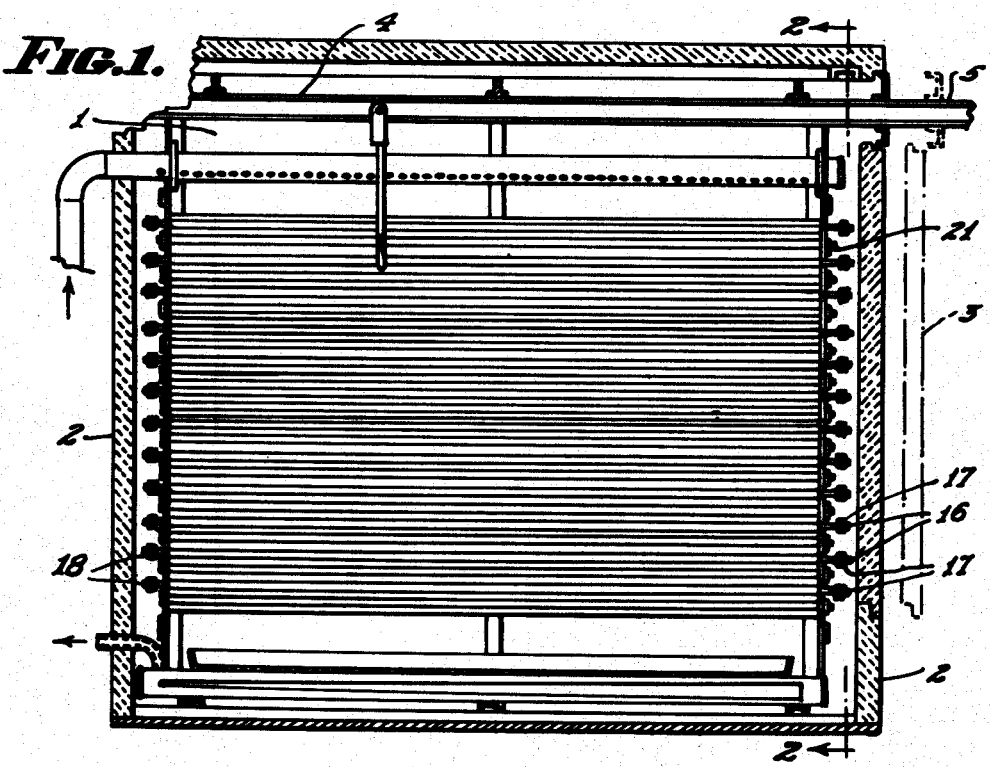
FIG.1.
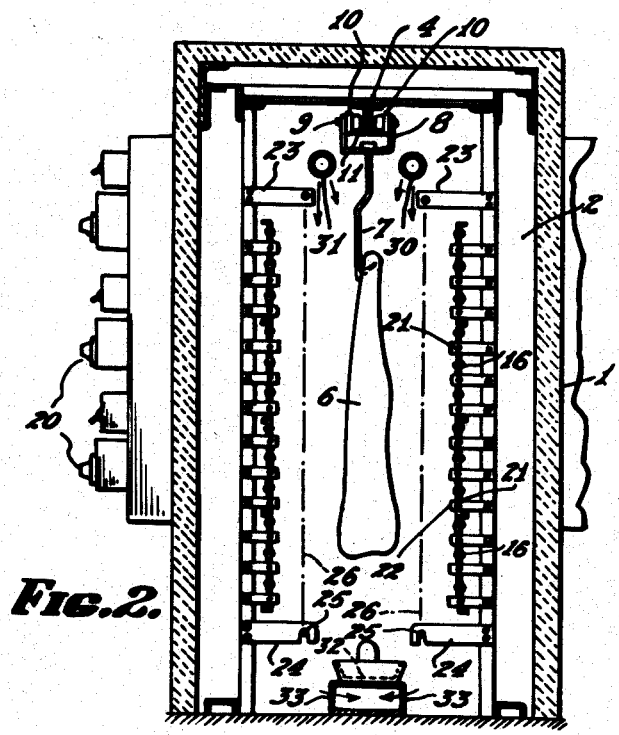
FIG.2.
FIG.3.
INVENTOR.
CLARENCE A. MILLS,
BY
ATTORNEYS.

Oct. 10, 1961 C. A. MILLS 3,003,409
ULTRA-LONG WAVELENGTH INFRARED RADIANT HEATING OVEN
Filed May 1, 1959 3 Sheets-Sheet 2

INVENTOR.
CLARENCE A. MILLS,
BY
ATTORNEYS.

Oct. 10, 1961 C. A. MILLS 3,003,409
ULTRA-LONG WAVELENGTH INFRARED RADIANT HEATING OVEN
Filed May 1, 1959 3 Sheets-Sheet 3

INVENTOR.
CLARENCE A. MILLS,
BY
ATTORNEYS.

United States Patent Office 3,003,409
Patented Oct. 10, 1961

3,003,409
ULTRA-LONG WAVELENGTH INFRARED RADIANT HEATING OVEN
Clarence A. Mills, Cincinnati, Ohio, assignor to Reflectotherm, Inc., Cincinnati, Ohio, a corporation of Ohio
Filed May 1, 1959, Ser. No. 810,453
6 Claims. (Cl. 99—331)

In the meat packing industry, for example in the preparation of bacon, it is desirable that the bacon bellies undergo a heat treatment after the pickling and other possible treatment has been completed. The effect of this heat treatment is to bring out the red color of the non-fat portions of the bacon. Prior to this heat treatment the injection of pickling solution containing nitrates has been carried out. That the lean portions of the bacon shall be red instead of gray is due to a combination of chemical injection of the pickling solution into the meat, and a treatment to insure that the injected material is spread evenly throughout the meat, and thereafter the establishing and maintaining of certain optimum temperatures for the chemicals to change the muscle pigments to a deeper red color.

In the customary smoke house, heat treatment of meats is carried out in conjunction with the smoking. This is accomplished by circulating moderately hot smoky air around the hanging pieces of meat in the smoke house for 8 to 16 hours, this long exposure period being required for the air heat to penetrate to the center portions of the meat. Attempts at more rapid heating of the meat at higher circulating air temperatures leads to overheating of the meat surfaces before the desired center temperatures are attained.

Much more rapid heating of the deeper portions of the meat, without overheating of its surface layers, can be accomplished by exposure to the ultra-long wavelength infrared radiations as now described, with provisions for preventing overheating of the surface layers by the shorter wavelength infrared radiations also emitted by the carbon blacked hot plates.

As is explained in co-pending application Serial No. 740,374, filed June 6, 1958, the coating of the heater plates with amorphous carbon black surfacing and the heating of these surfaces to from 200 to 500° F. brings the amorphous carbon atoms into a state in which they associate readily into pairs with the emission of ultralong wavelength infrared rays and dissociate readily back to single atoms as new energy for the dissociation is supplied from the adjacent hot plate.

The basis for my invention in theoretical physics depends on the tendency of carbon atoms in the amorphous state (lampblack carbon-black) to associate in pairs, with the four active outer electrons of each carbon atom joining into a close lattice semi-crystalline structure (the so-called electron octet), and in going from the freely active state into this octet lattice structure much of the previous energy of motion of the electrons is transmitted over into vibrational activity of the new molecules of paired carbon atoms, and this excess vibrational energy causes these molecules to emit definite quantums of energy in the 100 to 400 micron wave length of the ultra-long infrared range. This octet lattice structure can be converted back to the individual carbon atoms with freely active outer electrons by an energy or heat input from the hot plate sufficient to counterbalance the heat loss from its carbon-blacked surfaces. Amorphous carbon black maintained within the temperature range of 200° to 500° F. thus acts as a continuous generator of ultra-long wavelength infrared radiations as the carbon atoms associate into pairs time after time, with intervening dissociations back into the single carbon atom state under the influence of new heat energy supplied from the adjacent hot plates.

It is known that the penetrability of radiant energy into and/or through materials such as meat is dependent upon the wavelength of such radiant energy; in general the shorter the infrared wavelength the less the penetration and the longer the wavelength the greater the penetration. The very long infrared wavelengths as developed by high-frequency electrical oscillations, for instance, penetrate well through most non-metallic materials, with a minor portion of their radiant energy being interrupted and transformed into sensible heat in their passage through the material. Such penetrating energy has been used for the through-and-through heating of many types of materials in commerce where local deep heat development is desired. The wavelengths of energy most effective for such purposes seem to be those of 100 to 400 micron wavelength, although the evidence in this area of science is far from specific.

Amorphous carbon-black surfacing, maintained at 200° F. to 500° F. for output of ultra-long wavelength infrared rays most penetrating for deep heating of organic materials requires a minimum of binder, so as to leave carbon atoms free to associate into pairs or disassociate back to individual atoms (the essential feature of my use of amorphous carbon for ultra-long ray emission or for absorption of the same type of ray emitted from materials undergoing a "change of state").

It is my object to provide an air stream with controlled temperature, velocity, and direction, for preventing short-ray infrared overheating of product surface layers while deep temperatures are being brought up to desired levels.

I may utilize static or conveyorized positioning of product between carbon blacked hot plates for radiant heat reception, and an air stream for preventing surface overheating by short-ray infrared heat.

Interpositioning of short-ray infrared absorbing material (such as cellophane) between hot plates and product may be used to further reduce or prevent overheating of product surfaces while center heating proceeds as desired.

In the drawings I have illustrated a preferred arrangement of mechanism in an ultra long wave length infrared radiant heating oven for carrying out my new system.

Figure 6:
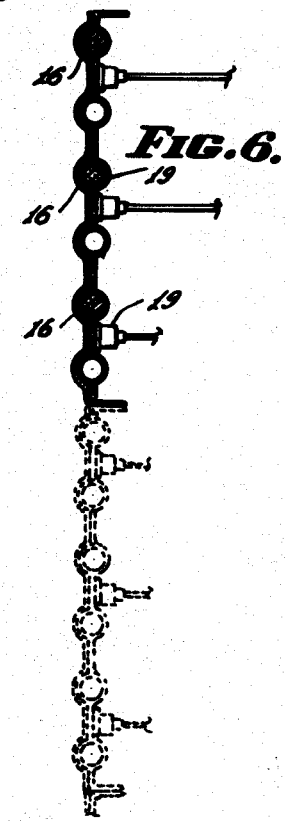
Figure 5:
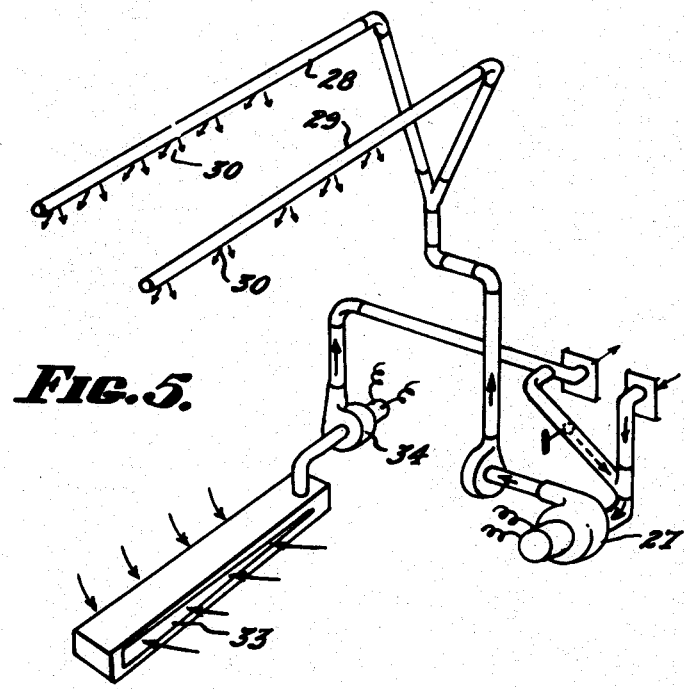
Figure 7:
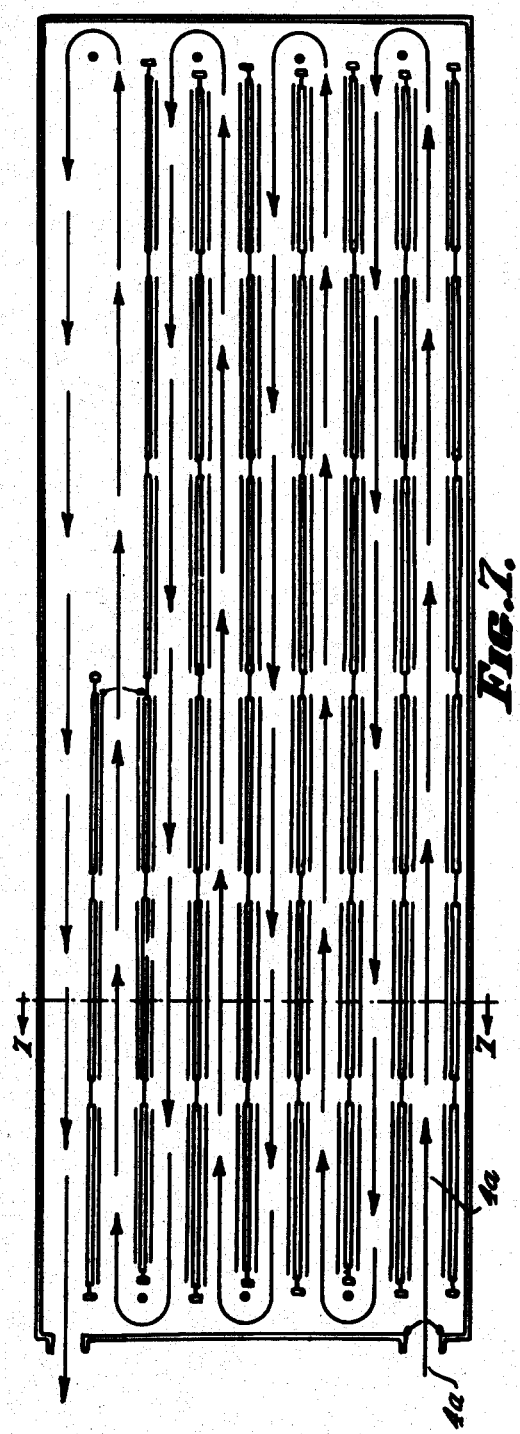
Figure 8:
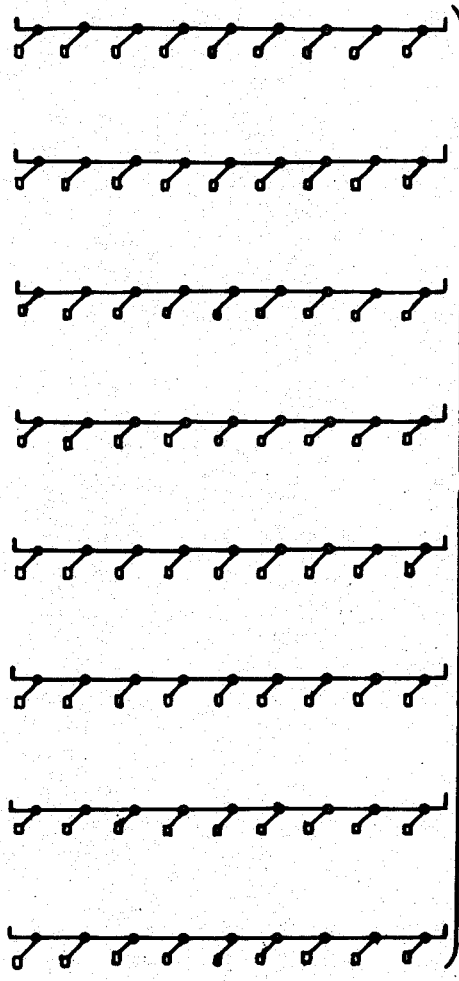

In the drawings:
FIGURE 1 is a vertical sectional view taken lengthwise of the oven.
FIGURE 2 is a vertical sectional view taken laterally of the oven.
FIGURE 3 is a perspective view of one of the heating units as combined to form a complete heating wall for an oven.
FIGURE 4 is a diagrammatic plan view of the switch and thermostat connections for an oven.
FIGURE 5 is a perspective view of the piping, pumps and air current movements.
FIGURE 6 is a sectional view of one of the radiant heating walls.
FIGURE 7 is a diagrammatic view indicating how an individual oven as shown in FIGURES 1 and 2 is compounded to make a large capacity continuous operating oven.
FIGURE 8 is a diagram indicating how the switches, and thermostats would be arranged for a continuous oven such as is shown in FIGURE 7.

The unit illustrated in FIGURES 1 to 6, which is a testing unit of adequate size to be used on regular production sides or flanks of bacon, ham and other meats, has side 1 and end 2 closing walls built up from insulating blocks to form the enclosing walls of the oven.

One end of the oven has vertically hinged doors or closures 3 which are adapted to be swung together to close the oven walls when a piece of meat is being radiantly heated. A T rail 4 extends the length of the oven being extended outside the oven as indicated at 5, so that hunks of meat such as are indicated at 6 may be suspended on a hook member 7 secured to a swivel bracket 8 supported by the journal bearing 9 of a pair of pulleys 10 which ride along on the lower flanges 11 of the rail 4. Thus it will be obvious how a hunk of meat or a side of bacon may be mounted and moved into the oven for a desired treatment.

There are two heating plates in opposed position on each side of the suspended meat piece. FIGURE 3 shows the units for each heating plate. There is illustrated in FIGURE 3 a tube in strip plate 12 having flanges 13 and 14 at the top and bottom of each tube in strip plate. There are a series of tubes 15 in each plate formed during manufacture of the plate. Each alternate tube has a Calrod 16 connected at its ends with appropriate wire connections 17, 18. Secured against each plate in the vicinity of each Calrod there is a thermostat bulb 19 connected in the wiring circuit with the thermostat control dial 20 located outside the oven.

Extending through the tubes between those provided with Calrods are bars 21 supported at the ends to provide a rigid assembly, and take the weight off the Calrods. Brackets 22 at the ends of the oven receive the bars 21. At the top and bottom above the brackets 22 there are large brackets 23, 24, adapted to receive the end supports usually rods 25 of sheets of cellophane as indicated in dotted lines 26 which may be employed to reduce the penetration of short wave infra-red rays which, being emitted from the heating plates, might tend to overheat the surface of the meat.

To minimize the effect of the emission of the short infrared rays, I have provided a method of circulating a blanket of cooling air down between the suspended meat and the heating plates.

In FIGURE 5 a preferred system of cooling is diagrammatically shown. A blower 27 is indicated which draws cool air, usually from outside the oven room at normally room temperature from 60° to 70° F. This air is blown up to two header pipes 28, 29, each provided with perforations 30, 31, extending in lines along the bottom of the headers.

The air blankets as they move down between the heating plates and the meat have the temperatures raised to from 150 to 160° F. At the bottom of the oven below the drip pan 32 there is an air movement stabilizing suction device which consists in a rectangular box having slots 33 at the sides of the box. The openings of the slots are tapered from the end removed from the suction blower 34 so that they are wider at the remote ends than at the outlet ends.

Thus the air blankets will not tend to have their even flow downwardly disrupted by cross currents and will flow evenly down through the oven.

The electrical wiring and contacts for the switches and thermostats are indicated diagrammatically in FIGURE 4. A positive inlet wire is indicated at *a*. Separate wires *b* are connected to the inlet and these wires connected to the switches *c*. The thermostat control knobs are indicated at *d* and the thermostat bulbs *e* which are arranged in spaced position on the heating plates have thermostat tubes *f* connected to the thermostat control knobs. The circuits are completed by the wires *f* which connect to the negative wire cable *g*.

It will be obvious from the control system described that any desired temperatures may be obtained at desired levels in the oven. Thus a variety of radiant heat exposure may be provided at different levels which permits variations in treatment of the meats to secure the most desirable conditions of heating.

For a continuous heating oven the diagram in FIGURE 7 indicates how this is accomplished. The track is formed by the T rails 4*a* having return bend loops at the ends so that one pulley load of meat introduced at the openings may push before it all the pulleys supporting pieces of meat forward and back until the final discharge opening is reached after which the meat may be removed from the hooks or the smoking process can be carried out continuously. Otherwise each pulley may be attached to a chain or steel cable conveyor.

Wiring circuits for the continuous oven are indicated in the diagram in FIGURE 8. It is merely a multiplicity of the system shown in FIGURES 2, 3, 4 and 6.

It will be understood that the purpose of the ultra long wavelength infrared radiant heating units described are primarily to provide a controlled exposure to meat so that the advantages of heat applied direct to the inside portions of meat being treated may be achieved thereby eliminating slow heating and very materially increasing both the speed and efficiency of the heating treatment.

Having thus described my invention, what I claim as new and desire to secure by Letters Patent is:

1. An ultra long wavelength infrared radiant heating system comprising an oven consisting of enclosing walls having an end closure, a track extending into the oven at the end having the closure, pulleys and a support for a hunk of meat mounted for movement along said track, a pair of non-glossy amorphous carbon black coated radiant heating plates facing each other at the sides of and below said track, means for electrically heating the plates to from 200° to 500° F. so as to project ultra long wavelength infrared radiant heat waves each toward the surface of the other, and means for controlling the temperature of the plates at various elevations within the oven.

2. An ultra long wavelength infrared radiant heating system comprising an oven consisting of enclosing walls having an end closure, a track extending into the oven at the end having the closure, pulleys and a support for a hunk of meat mounted for movement along said track, a pair of non-glossy amorphous carbon black coated radiant heating plates facing each other at the sides of and below said track, means for electrically heating the plates to from 200° to 500° F. so as to project ultra long wavelength infrared radiant heat waves each toward the surface of the other, means for controlling the temperature of the plates at various elevations within the oven, and sheets of cellophane suspended in the oven between said heating plates.

3. An ultra long wavelength infrared radiant heating system comprising an oven consisting of enclosing walls having an end closure, a track extending into the oven at the end having the closure, pulleys and a support for a hunk of meat mounted for movement along said track, a pair of non-glossy amorphous carbon black coated radiant heating plates facing each other at the sides and below said track, means for electrically heating the plates to from 200° to 500° F. so as to project ultra long wavelength infrared radiant heat waves each toward the surface of the other, means for controlling the temperature of the plates at various elevations within the oven, and sheets of cellophane suspended in the oven between said heating plates, and means for moving blankets of cooling air down through the oven between said ultra-long ray radiant heating ray emission plates.

4. An ultra long wavelength infrared radiant heating system comprising an oven consisting of enclosing walls having an end closure, a track extending into the oven at the end having the closure, pulleys and a support for a hunk of meat mounted for movement along said track, a pair of non-glossy amorphous carbon black coated radiant heating plates facing each other at the sides and below said track, means for electrically heating the plates to from 200° to 500° F. so as to project ultra long wavelength infrared radiant heat waves each toward the surface of the other, means for controlling the temperature of the plates at various elevations within the oven, and sheets of cellophane suspended in the oven between said heating plates, and means for moving blankets of cooling air down through the oven between said sheets of cellophane.

5. An ultra long wavelength infrared radiant heating system comprising an oven consisting of enclosing walls having an end closure, a track extending into the oven at the end having the closure, pulleys and a support for a hunk of meat mounted for movement along said track, a pair of non-glossy amorphous carbon black coated radiant heating plates facing each other at the sides and below said track, means for electrically heating the plates to from 200° to 500° F. so as to project ultra long wavelength infrared radiant heat waves each toward the surface of the other, means for controlling the temperature of the plates at various elevations within the oven, and sheets of cellophane suspended in the oven between said heating plates, means for moving blankets of cooling air down through the oven between said sheets of cellophane and means for equalizing the rate of flow of the air blankets.

6. An ultra long wavelength infrared radiant heating system comprising an oven consisting of enclosing walls having an end closure, a track extending into the oven at the end having the closure, pulleys and a support for a hunk of meat mounted for movement along said track, a pair of non-glossy amorphous carbon black coated radiant heating plates facing each other at the sides and below said track, means for electrically heating the plates to from 200° to 500° F. so as to project long wavelength infrared radiant heat waves each toward the surface of the other, means for controlling the temperature of the plates at various elevations within the oven, and sheets of cellophane suspended in the oven between said heating plates, means for moving blankets of cooling air down through the oven between said sheets of cellophane, means for equalizing the rate of flow of the air blankets, and means for equalizing the rate of flow of the air blankets comprising a long warmed air receiving box having slots at the sides of tapering width from front to exit through which the warm air is withdrawn.

References Cited in the file of this patent

UNITED STATES PATENTS

| | | |
|---|---|---|
| 1,531,414 | Ruben | Mar. 31, 1925 |
| 1,768,519 | MacLagan | June 24, 1930 |
| 2,138,813 | Bemis | Dec. 6, 1938 |
| 2,862,095 | Scofield | Nov. 25, 1958 |
| 2,898,437 | McFarland | Aug. 4, 1959 |

OTHER REFERENCES

Barber: "Industrial Application of Infrared," Electrical Engr., September 1953, pp. 764–769.